United States Patent Office 3,743,709
Patented July 3, 1973

3,743,709
PREPARATION OF HIGHLY POROUS ALUMINA
Geoffrey T. Shaw, Ottawa, Ontario, and Basil I. Parsons, Kars, Ontario, Canada, assignors to Canadian Patents and Development Limited, Ottawa, Province of Ontario, Canada
No Drawing. Continuation-in-part of application Ser. No. 736,589, June 13, 1968. This application July 12, 1971, Ser. No. 161,874
Int. Cl. C01f 7/34; B01j 11/36, 11/60
U.S. Cl. 423—628  6 Claims

ABSTRACT OF THE DISCLOSURE

Preparation of low density highly porous aluminas having large pores by initially drying a neutral (carbonate) gel of aluminum hydroxide with the gel temperature not exceeding about 100° C. until at least about 25% by wt. of the water has been removed, followed by further drying and calcining.

---

This application is a continuation-in-part of our application 763,589, filed June 13, 1968.

The subject matter of the present application is a process for the drying of aluminum hydroxide gel to form a highly porous alumina suitable for catalytic purposes, as a medium for the separation of gaseous or liquid substances by diffusion or adsorption processes, or simply as thermal insulation material.

The rate at which many industrial separation or conversion processes employing alumina proceed depends mainly on the amount of surface available to the reagents. For a wide variety of applications the best form of alumina is one containing a large number of wide diameter pores which provide easy access to the interior surfaces of the granule. All things being equal, the greater the surface area available to the reagents the greater the rate of adsorption or conversion; and the larger the pores, and the more accessible the surface, the less likelihood there is of hold-up of gas or liquid within the alumina structure. The rate of undesirable side reactions is generally at a minimum under conditions of low hold-up.

Alumina containing a large surface area concentrated mainly in small pores, 200 A. diameter or less, is normally prepared by rapidly drying and calcining basic aluminum hydroxide gel at high tempeartures. The hydroxide gel is usually prepared by adding an excess of an alkali, such as ammonium hydroxide to an aqueous solution of a suitable salt of aluminum such as aluminum nitrate. The water content of a typical aluminum hydroxide gel is in the range 85–95% by weight and the pH is about 9 to 11. The hydrous aluminum hydroxide is gradually converted to alumina in the course of dehydration. The conversion is not a sharply defined chemical transformation. The chemical composition of the gel gradually approaches that of alumina as more and more water is removed. The end point of the reaction is represented by the equation:

$$2Al(OH)_3 \cdot xH_2O \rightarrow Al_2O_3 + (2x+3)H_2O$$

At intermediate stages considerable chemically bonded water is associated with the alumina. The amount of water so bonded depends primarily on the temperature, and also (to a much lesser extent) on the humidity of the air in the drying apparatus. A typical alumina product from the dehydration of aluminum hydroxide gel contains 10–15% water at 325° C. and 2 to 5% at 500° C. The exact amount depends upon the specific method used in the preparation of the gel and the technique used to dry it.

The porous nature of the alumina is created in the dehydration process. As drying proceeds, and water is removed, the mass of the gel shrinks in volume. Eventually, the inorganic skeleton of the structure sets (at some intermediate state in the dehydration) and the space remaining when the last of the water is removed comprises the porous nature of the material. The high surface area alumina so formed is frequently called "alumina gel" in industrial practice. It should be noted that the material is not truly a gel. It is a finely dispersed form of aluminum oxide produced from a hydrous gel of aluminum hydroxide.

Many techniques have been proposed to increase the pore volume of alumina resulting from the precipitation and dehydration of the hydrous gel. The basis of several of these processes is the alteration of the surface tension of the liquid contained in the gel. The principle being that by lowering the surface tension of the liquid, the forces tending to draw the inorganic matter together are similarly reduced resulting in a more open structure. One method of achieving this reduction in surface tension is by heating the gel mass under high pressure above the critical temperature of the solvent. Under these circumstances the liquid can be removed in the vapour state with no surface tension effects. Another method entails the solution of small amounts of surface active agents to depress somewhat the surface tension of the liquid in the gel.

Leaching processes have also been used as a means of increasing the porosity. For example, hydrous gels soaked in a solution of a metallic salt, such as calcium chloride, can be then dried and freed of the salt by washing. Similarly, pellets or extruded shapes of hydrogel containing calcium carbonate can be formed then dried and finally extracted with acid to remove the calcium carbonate. Several processes involving volatilization and gasification for the improvement of the porosity have been reported as well. Finely divided or colloidal sulphur suspended in the wet gel can be later distilled out of the finished product. Soluble polysulphides have been used for the same purpose. An example of gasification is the case where a plastic gel is subjected to a high pressure of an inert gas in an enclosed vessel. The material can then be "popped" or foamed by suddenly releasing the pressure.

Still another approach to the problem of increasing the porosity of gels is based upon the inclusion of quantities of organic matter in the hydrous gel. Recently, processes have been developed for enlarging and controlling the pore volume in inorganic oxides such as alumina and silica gel by the addition of large amounts of water soluble organic polymers to the hydrous gel in the course of its preparation. The mixture of hydrous gel and polymer is then dehydrated at a low temperature until the inorganic structure sets and the organic matter is removed finally by calcination or hydrogenation. Polymers that were found to be effective were the polyethylene glycols, the polyethylene oxides, the polyvinyl alcohols, the polyacrylamides and the methyl cellulose compounds. Pore volumes as great as 5 ml./g. in alumina were obtained using this process (see Can. Pat. 706,356 dated Mar. 23, 1965).

The technique of adding water soluble polymers to the hydrous aluminum hydroxide gel prior to the dehydration step provides a wide degree of control over the pore size and pore volume distribution in alumina, but does involve considerable cost and complication. This is due primarily to the relatively large amounts of polymer material required and the control necessary in removing them. For a great many purposes, it has been found that it is desirable only to have a large pore volume concentrated in pores of greater than 500 A. diameter, and that within quite wide limits above 500 A. the actual size of the pores involved is not critical.

In the present application a process is described whereby a large increase in the pore size and pore volume in alumina can be achieved by dehydrating aluminum hydroxide gels which have been precipitated with carbonate base, slowly, in thin layers or extrusions etc., at low temperatures. These gels are neutral or substantially neutral i.e. pH within 6.5–8. The alumina so formed contains a pore volume in the range about 1.3 to 3.5 ml./g. (preferably about 2 or more) and a surface area of about 120–150 m.$^2$/g., compared to 0.5–0.8 ml./g. and 150–200 m.$^2$/g. for aluminas prepared by conventional methods. A large proportion of the pore volume contained in the alumina product occurs in pores of about 1000 to 2000 A. diameter. The cost of producing the highly porous forms of the alumina is only slightly more than by conventional means, and for a great many applications in catalytic and adsorption processes the increase in pore volume obtained is sufficient for current needs.

The low density product can be obtained by drying the hydrous gel in a manner than provides that the temperature of the gel does not exceed 100° C. until at least about 25–30% of the water has been removed. Once about 25–30% of the water in the gel has been removed the temperature can be increased and the drying process accelerated. It is possible to carry out the low temperature drying step in dryers operating at temperatures slightly greater than 100° C. by preparing the hydrous gel in the form of small diameter extrusions or in thin layers or strips. With a form where the surface to volume ratio is high, the cooling effect connected with the high rate of evaporation is sufficient to prevent the bulk of the gel from exceeding 100° C. until it is sufficiently dry and past the stage where high temperature has a detrimental effect. A simple technique for attaining the low temperature, low humidity drying conditions, is to prepare the hydrous gel as extrusions and to allow them to dry in open trays at room temperature or slightly above (40–75° C.). The process can be accelerated by using fans and increasing the number of air changes around the extrusions, or by using a conveyor belt and a drying tunnel.

After drying, the aluminum hydroxide product is calcined below sintering temperatures (about 700° C.) preferably at about 300 to 600° C. The alumina may then be pelletized to give pellets of strengths at least equal to conventional pellets but of significantly lower density.

The process works well with all commercial forms of aluminum hydroxide gel made with a carbonate. Gels prepared using hydroxides are not neutral and have not been found operative. Industrially such hydroxy-carbonate gels are usually made by adding sodium carbonate to an aqueous solution of aluminum chloride. Where the alumina is to be used for catalytic purposes, however, the gel must be thoroughly washed to remove adsorbed and occluded sodium salts. It has been our experience that much time and effort in washing can be saved by forming the gel using ammonium salts which can be ultimately removed in calcination. In Example 1 a typical "sodium free" recipe is described but it must be emhasized that the technique in preparing the neutral (carbonate) gel is not critical to the process.

EXAMPLE 1

The stock solutions used in the preparation of the hydrous gel were as follows:
(A) 750 g. aluminum nitrate, $Al(NO_3)_3 \cdot 9H_2O$ dissolved in two liters of distilled water,
(B) 288 g. ammonium carbonate, $(NH_4)_2CO_3$, and 120 ml. concentrated ammonium hydroxide (28% by weight $NH_3$ in water) dissolved in four liters of distilled water, and
(C) A washing solution, consisting of 2 mls. of concentrated ammonium hydroxide in one liter of distilled water.

Hydrous aluminum hydroxide gel was formed by adding solution A to solution B, at room temperature, over a period of 30 minutes. The resultant mixture was slightly alkaline, pH=7.5. The precipitate was allowed to settle overnight, as much as possible of the supernatant liquid decanted off, and the remaining liquid removed in a stainless steel pressure filter. The concentration of soluble salts in the gel was reduced by washing it twice with small quantities of solution C. The water content of the washed, filtered gel was 92% by weight.

Approximately one-half of the batch of the washed gel was formed into ⅛-inch diameter extrusions and placed on a slowly moving conveyor belt. The extrusions were made by forcing the gel through a short length of ⅛-inch diameter tygon tubing with a series of rollers working a peristaltic fashion. The extrusions were carried by the conveyor belt under a drying hood where they were exposed to infra-red heat from overhead lamps and to warm forced air from ducts along the side. The drying tunnel was approximately 10 feet long and the rate of travel of the belt was 1 foot per minute, i.e. the residence time of the gel was 10 minutes. The surface temperature of the belt rose to nearly 100° C. at the discharge end but the gel temperature did not exceed 50° C. because of the cooling effect associated with evaporation. As the gel passed through the drying hood, 40–45% of the water present was removed. On discharge, the extrusions were dry enough so that they did not lose their shape, or run together, as they piled up in trays. The trays of extrusions were allowed to stand overnight at room temperature then dried in an air oven at 200° C., coarsely ground to pass a 10 mesh screen, and finally calcined at 310° C. for 6 hours.

For comparative purposes, the remaining half of the hydrous gel was spread in a layer 1 inch thick over aluminum sheet and dried in an air oven at 310° for 6 hours.

Both portions were ground and the −14, +30 mesh fraction (U.S. Standard Sieve Sizes) separated for bulk density measurements. The results were as follows:

TABLE 1

| Method of Drying | Apparent bulk density −14, +30 mesh fraction, g./ml. |
|---|---|
| ⅛-inch dia. extrusions, dried slowly in two steps at low and high temperature | 0.21 |
| 1 inch layer dried rapidly at high temperature | 0.61 |

In this example the hydrous gel was dried at low temperature until the water content was reduced 40–45% by weight. It is not essential to dry the gel at low temperatures to this extent to obtain the highly porous form, but it is desirable from the standpoint of producing extrusions which can be easily handled and are stable in shape after this first drying step. To prepare the highly porous form it is only necessary to expose the hydrous gel to the drying atmosphere at low temperatures until the water content is reduced about 25–30% before beginning to apply more conventional high temperature drying conditions. The results of experiments described in Example 2 demonstrate this point.

EXAMPLE 2

The hydrous gel used in the following two series of experiments was compressed aluminum hydroxide (carbonate) gel, Type F, manufactured by the Reheis Co. of Berkeley Heights, N.J. The water content of the Reheis gel was 90% by weight.

In one series of experiments, small weighed batches (300 grams each) of ¼-inch diameter extrusion of the hydrous gel were placed on trays and exposed to dry in the air at room temperature for periods of time ranging from 3 to 24 hours. In another, small weighed batches of ¼-inch diameter extrusions were placed in a laboratory-scale, vacuum drying oven operating at 75° C. and 13.7 p.s.i. vacuum, for periods of time ranging from 30 minutes to 3 hours. At the end of each of the drying tests the extrusions were re-weighed and the amount of water lost from the batch calculated by difference. The extrusions were then placed, overnight, in a preheated muffle furnace operating at 400° C. After calcination the samples were crushed and the −14, +30 mesh fraction separated for apparent bulk density measurements. Two batches of extrusions were prepared and calcined immediately as control specimens. The results of the experiments are summarized in Table 2.

TABLE 2

| Specimen number | Treatment of wet gel | Percent water removed from gel prior to calcination at 400° C. | Apparent bulk density (g./ml.) −14, +30 mesh fraction |
| --- | --- | --- | --- |
| A-399 | Immediate calcination | 0 | 0.54 |
| A-409 | | 0 | 0.56 |
| A-396 | | 13.3 | 0.43 |
| A-397 | | 16.1 | 0.42 |
| A-420 | | 19.2 | 0.44 |
| A-395 | Air dried at room temperature. | 25.9 | 0.23 |
| A-398 | | 29.0 | 0.22 |
| A-421 | | 54.2 | 0.21 |
| A-400 | | 79.7 | 0.22 |
| A-426 | | 14.0 | 0.47 |
| A-425 | | 26.6 | 0.25 |
| A-424 | Vacuum dried at 75° C | 32.7 | 0.22 |
| A-427 | | 44.5 | 0.19 |
| A-428 | | 64.1 | 0.20 |

The apparent bulk density of the calcined alumina gel was observed to decrease rapidly as the exposure time was lengthened and the water content decreased prior to the application of high temperature drying conditions. The results of the experiments indicate that the hydrous gel need only be exposed to the drying atmosphere at low temperatures until the water content is reduced about 25–30% to obtain the highly porous form. Reducing the water content more than 30%, to say 50–60%, greatly facilitates handling and insures a more uniform shape of product in the case of extrusions, but does not result in the formation of a more (or less) porous alumina.

A series of experiments, similar to that described in Example 2, were also made using carbon dioxide and nitrogen gas drying atmospheres to determine whether the formation of the low density structure was in any way dependent on the chemical nature of the drying medium. Essentially identical results were obtained with both the $CO_2$ and pure nitrogen as were obtained with air.

The following example illustrates still further the advantage of drying hydrous aluminum hydroxide gel in thin sections or extrusions, and indicates the extent of control that can be achieved over the pore size and pore volume distributions in alumina.

EXAMPLE 3

The hydrous gel used in these experiments was the same type as used in Example 2. Four portions (approximately 300 grams each) were spread evenly in layers ⅛, ¼, ½ and ¾ inches thick on aluminum sheet and dried overnight in an air oven operating at a nominal 200° C. Considerable care was taken in the initial preparation of the layers of gel to maintain uniform thickness. In the course of drying, the layers cracked extensively and the bulk of the gel shrunk in volume. The drying rates were controlled so that the two thinner layers had at least 25% of the water removed at gel temperatures below 100° C. Following the drying step the samples were crushed lightly to pass a 10 mesh screen, then calcined at 325° C. for 4 hours. The −14, +30 mesh fraction (U.S. Standard Sieve Sizes) was separated from the samples after calcination for apparent bulk density and pore volume distribution measurements. The pore volume distribution in the samples was determined by the mercury injection technique (see G. T. Shaw, B. I. Parsons and D. S. Montgomery, "Porosimetry by Mercury Injection" Mines Branch Technical Bulletin No. 45, Department of Mines and Technical Surveys, Ottawa (1963)). The pore volumes and the apparent bulk density values are listed in Table 3.

TABLE 3

| Specimen number | Thickness of gel layer (inches) | Bulk density of −14, +30 mesh fraction (g./ml.) | Total pore volume (ml./g.) | Average pore diameter (A.) range |
| --- | --- | --- | --- | --- |
| A-198 | ⅛ | 0.22 | 2.1 | 2,000–800 |
| A-197 | ¼ | 0.28 | 1.3 | 2,000–100 |
| A-196 | ½ | 0.39 | 0.8 | 200–60 |
| A-195 | ¾ | 0.57 | 0.5 | 100–40 |

A marked increase was observed in both the average pore size and total pore volume as the thickness of the gel layer was decreased. A corresponding decrease occurred in the apparent bulk density. The average pore size of the dense form of the alumina (the ¾-inch layer) occurred in the region of 100–40 A. diam. and the total pore volume was about 0.5 g./ml.; whereas the average pore size in the low density gel (the ⅛-inch layer) occurred in the range 2000 to 800 A. diam. and the total pore volume was approximately 2.1 ml./g. The results of the measurements on the samples prepared from the ½ and ¼ inch layers fell in intermediate positions.

EXAMPLE 4

Experiments were also undertaken to establish whether the age of the hydrous gel was an important factor. Aluminum hydroxide gel is normally prepared by a precipitation process and it is generally acknowledged that particle size and shape in a wet precipitate frequently changes with time. To test this idea, a large batch of hydrous aluminum hydroxide gel was prepared according to the procedure described in Example 1 and divided into two parts. The drying of the first half of the batch was begun within two hours of the precipitation step. The second half was wrapped tightly in a polyethylene bag and stored for a period of one week before beginning the drying process. In both instances the gel was dried in the shape of ¼-inch diameter extrusions, laid in rows 1 inch apart on aluminum sheet. Part of each lot of extrusions was placed immediately in a calcining furnace operating at 400° C. (no low temperature drying) and the remainder was air dried slowly at room temperature for 24 hours prior to calcination. After calcination the samples were crushed and the −14, +30 mesh fraction separated for apparent bulk density measurements. The results of the measurements are shown in Table 4.

TABLE 4

| Specimen Number | Age of gel | Method of drying | Apparent bulk density, g./ml. −14, +30 fraction |
| --- | --- | --- | --- |
| A-403 | 2 hours | Calcined immediately | 0.64 |
| A-404 | do | Air dried slowly, then calcined | 0.26 |
| A-407 | 1 week | Calcined immediately | 0.58 |
| A-408 | do | Air dried slowly, then calcined | 0.24 |

There was no significant different observed in the effect of low temperature drying with the age of the gel. The apparent bulk density of both the fresh and the week old gels dried at low temperatures was approximately half of those dried at high temperature. There was also no measurable difference in performance with the Reheis Type F gel (used in Example 2) over a nine month period.

To demonstrate the ineffectiveness of the process when applied to non-carbonate gels, two samples of hydrous aluminum hydroxide gel were prepared using a well established procedure described by Ciapetta and Plank, vol. I of textbook "Catalysis" P. 327, Reinhold, New York, 1954.

In this procedure the gel was precipitated under normal room temperature conditions from aluminum nitrate using ammonia. The manipulations involved are quite simple and no complicated or prolonged digestions were required. We made up two lots of gel at pH=7.0 and pH=8.0 as follows:

(a) pH=7.0

Reagent Solution 1—140 ml. concentrated ammonia diluted to 1 liter with distilled water
Reagent Solution 2—240 g. $Al(NO_3)_3$ .$9H_2O$ dissolved in 2 liters of water The gel was precipitated by adding solution 1 to solution 2 as quickly as possible with vigorous stirring at room temperature. The pH of the resultant slurry was determined using pH test paper (and found to be approximately 7.0). The precipitate was allowed to settle, the bulk of the liquid decanted and the remaining liquid removed in an earthenware vacuum filter.

(b) pH=8.0. Similar to pH=7.0 (a) except that 150 ml. concentrated ammonia was used to precipitate the hydrous gel.

For comparison a further prior art hydroxide material was prepared. In the U.S. Pat. 3,193,349 (1965), Mooi, the procedures described are designed to enhance the formation of crystalline Boehmite. The gel is precipitated from a hot aluminum chloride solution using either ammonium carbonate, ammonia or a combination of both. Any of the recipes involving carbonate require a prolonged digetsion at 175–200° F. to accomplish his purpose (Boehmite crystals). In our view this prolonged digestion is impractical. According to the patent equivalent results were obtained by following his example "No. 1070–70 I" described in Table 1 of the patent (see column 5) which required only the high temperature preciiptation at pH=8.5 with ammonia and no digetsion. The details of this preparation are as follows:

(c) The gel was formed by adding (simultaneously from burets) 500 ml. of 2 molar $AlCl_3$ solution and 6 N ammonia into 750 mls. of boiling distilled water. The pH was maintained at 8.5 by regulating the rate of addition. The precipitation was accomplished slowly over a period of approximately 30 minutes. Thereafter the slurry was separated from the excess liquid using an earthenware vacuum filter and washed with a dilute solution of ammonia.

Drying procedure

Portions of each sample (a), (b) and (c) of hydrous gel were dried according to the present two-stage procedure, i.e. the gel was spread out in a ⅛-inch thick layer on an aluminum sheet, allowed to air-dry at room temperature for 15–20 hours then calcined at 500° C.

A portion of the gel made by the Mooi U.S. Pat. 3,193,349 recipe was also dried quickly in one step by placing it directly into the calcining oven at 500° C.

The results of bulk density measurements on the calcined −14, +30 mesh fractions are summarized below (for comparison, gels of Examples 1 and 2 herein are included):

TABLE 5

| | Apparent bulk density (g./ml.) | |
|---|---|---|
| Gel preparation | Present invention, 2-stage drying | High temperature drying |
| (a) pH=7.0 | 0.87 | |
| (b) pH=8.0 | 0.80 | |
| (c) pH=8.5 | 0.63 | 0.59 |
| Examples 1 and 2 | 0.2–0.3 | 0.5–0.6 |

The above results when viewed with the measurements described in Examples 1–4 herein clearly demonstrate that two-stage drying is only effective with gels precipitated with carbonate (but not digested so as to form crystalline Boehmite). Low temperature drying of the carbonate gel produces a soft, highly porous alumina with an apparent bulk density of approximately 0.2 g./ml. The aluminas produced by these prior art procedures are hard, dense materials not at all like those described herein.

Samples of the alumina hydrate (uncalcined) corresponding to (b), (c) and Example 2 herein have been subjected to X-ray diffraction examination. The results showed that (c) was predominately Boehmite; (b) contained a trace of Boehmite; and Example 2 material had no crystal structure.

What is claimed is:
1. A process for preparing low density highly porous alumina, consisting essentially of
   (a) precipitating aluminum hydroxide from an aqueous solution containing aluminum cations with a carbonate salt of a strong base and recovering the hydrous aluminum hydroxide gel having a neutral pH of within 6.5–8,
   (b) partially dehydrating the neutral hydroxide gel in thin sections not more than about 0.25 inch thick to remove at least about 25% by wt. of the water, while the gel temperature does not exceed about 100° C., the dehydrated gel being substantially free of crystal structure,
   (c) raising the gel temperature to above 100° C., and
   (d) calcining the dried get at temperatures below about 700° C. to alumina having an apparent bulk density (−14 +30 mesh) below about 0.3 g./ml., a pore volume of at least about 1.3 ml./g. and having large diameter pores.
2. The process of claim 1 wherein the neutral hydroxide gel from (a) is formed into thin layers or extrusions and partially dried according to (b) at from ambient temperature to less than 100° C.
3. The process of claim 1 wherein the calcining temperature is 300 to 600° C.
4. The process of claim 1 wherein ammonium carbonate is used to form the gel.
5. The process of claim 1 wherein from about 25 to about 50% of the water is removed in step (b).
6. The process of claim 1 wherein residual salt anion and the carbonate salt are selected to decompose and volatilize on heating.

References Cited
UNITED STATES PATENTS
3,193,349    7/1965    Mooi _____ 23—143

MILTON WEISSMAN, Primary Examiner

U.S. Cl. X.R.
423—630; 252—463; 55—74